(12) United States Patent
Rottmann

(10) Patent No.: US 11,360,444 B2
(45) Date of Patent: Jun. 14, 2022

(54) AUTOMATED POWER CONTROLS FOR COOLING MANAGEMENT

(71) Applicant: Norbert Rottmann, Landau (DE)

(72) Inventor: Norbert Rottmann, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 2474 days.

(21) Appl. No.: 14/016,788

(22) Filed: Sep. 3, 2013

(65) Prior Publication Data

US 2014/0074259 A1 Mar. 13, 2014

(30) Foreign Application Priority Data

Sep. 5, 2012 (EP) ..................................... 12183119

(51) Int. Cl.
*G05B 15/02* (2006.01)
*G05B 19/04* (2006.01)
*G05B 19/042* (2006.01)

(52) U.S. Cl.
CPC ......... *G05B 15/02* (2013.01); *G05B 19/0423* (2013.01)

(58) Field of Classification Search
None
See application file for complete search history.

(56) References Cited

U.S. PATENT DOCUMENTS

| | | | | |
|---|---|---|---|---|
| 4,458,307 A * | 7/1984 | McAnlis | ............. | G06F 11/1441 365/228 |
| 4,835,733 A * | 5/1989 | Powell | ................. | G06F 12/0623 365/231 |
| 5,274,313 A * | 12/1993 | Amrhein | ............... | G01R 31/343 318/400.38 |
| 5,463,775 A * | 10/1995 | DeWitt | .................. | G06F 11/323 702/186 |
| 6,049,798 A * | 4/2000 | Bishop | ................. | G06F 11/3495 |
| 6,199,173 B1 * | 3/2001 | Johnson | .................. | G06F 1/206 714/3 |
| 6,567,262 B2 * | 5/2003 | Meir | ......................... | G06F 1/20 361/676 |
| 6,624,636 B2 * | 9/2003 | Arai | ......................... | B60K 6/22 324/426 |

(Continued)

FOREIGN PATENT DOCUMENTS

| | | | | |
|---|---|---|---|---|
| CN | 102375698 A | * | 3/2012 | ............... G06F 3/06 |
| EP | 2 420 908 | | 2/2012 | |

OTHER PUBLICATIONS

Tanenbaum, A.S., "Operating Systems: Design and Implementation", 1987, Chapter 5.*

(Continued)

*Primary Examiner* — Mohammad Ali
*Assistant Examiner* — Kelvin Booker
(74) *Attorney, Agent, or Firm* — Cozen O'Connor

(57) ABSTRACT

A method for operating an automation device having a CPU module for processing a control program and a source module that is connected via a bus and is intended to supply sink modules of the automation device with electrical energy, wherein variables that are available to the automation device and which influence the operation of the automation device are recorded so as to make it possible to relieve the load on the CPU module when preprocessing the influencing variables.

4 Claims, 2 Drawing Sheets

(56) References Cited

U.S. PATENT DOCUMENTS

| | | | | |
|---|---|---|---|---|
| 7,725,238 B2* | 5/2010 | Perkins | .................... | B60T 1/10 |
| | | | | 123/563 |
| 7,859,842 B2* | 12/2010 | Busch | .................... | H01L 23/467 |
| | | | | 361/697 |
| 2004/0034553 A1* | 2/2004 | Cole | .................... | G06Q 10/103 |
| | | | | 705/301 |
| 2004/0064578 A1* | 4/2004 | Boucher | ................. | H04L 29/06 |
| | | | | 709/236 |
| 2004/0064589 A1* | 4/2004 | Boucher | ................. | H04L 69/12 |
| | | | | 709/250 |
| 2005/0276138 A1* | 12/2005 | Inoue | .................... | G11C 8/08 |
| | | | | 365/210.1 |
| 2006/0085533 A1* | 4/2006 | Hussain | ................ | G06F 9/4498 |
| | | | | 707/E17.041 |
| 2007/0049134 A1* | 3/2007 | Conroy | .................... | G06F 1/26 |
| | | | | 439/894 |
| 2007/0098564 A1* | 5/2007 | Sorge | .................... | F04B 49/065 |
| | | | | 417/32 |
| 2007/0109143 A1* | 5/2007 | Klofer | .................... | G01D 3/08 |
| | | | | 340/665 |
| 2008/0114937 A1* | 5/2008 | Reid | .................... | G06F 11/362 |
| | | | | 710/22 |
| 2008/0170447 A1* | 7/2008 | Jiang | .................... | G11C 7/1006 |
| | | | | 365/189.011 |
| 2008/0303461 A1* | 12/2008 | Knab | .................... | H02H 7/093 |
| | | | | 318/278 |
| 2010/0076612 A1* | 3/2010 | Robertson | ........... | H02M 5/4505 |
| | | | | 700/286 |
| 2013/0075074 A1* | 3/2013 | Chiang | .................... | F28F 21/02 |
| | | | | 977/750 |
| 2013/0312092 A1* | 11/2013 | Parker | ................. | H04L 63/1408 |
| | | | | 726/22 |
| 2013/0340995 A1* | 12/2013 | David | .................... | F28F 27/00 |
| | | | | 165/287 |
| 2013/0345893 A1* | 12/2013 | David | .................... | G05D 23/00 |
| | | | | 700/300 |
| 2014/0048610 A1* | 2/2014 | Abert | .................... | G05D 23/01 |
| | | | | 236/93 R |
| 2014/0095812 A1* | 4/2014 | McLachan | ........... | G06F 12/023 |
| | | | | 711/154 |

OTHER PUBLICATIONS

Adamchik, V.S., "Stacks and Queues", 2009, Carnegie Mellon University, School of Computer Science, Retrieved from the Internet on May 11, 2019. (Year: 2009).*

Ghosh et al., "Smart Refresh: An Enhanced Memory Controller Design for Reducing Energy in Conventional and 3D Die-Stacked DRAMs", 2007, 40th IEEE/ACM International Symposium on Microarchitecture. (Year: 2007).*

Carter et al., "Impulse: Building a Smarter Memory Controller", Jan. 9-13, 1999, Proceedings Fifth International Symposium on High-Performance Computer Architecture. (Year: 1999).*

Siemens-Catalog ST PCS Jun. 7, 2012; Process Control System Simatic PCS 7; 2012.

Office Action dated Aug. 3, 2016 which issued in the corresponding Chinese Patent Application No. 2013103957208.

* cited by examiner

AUTOMATED POWER CONTROLS FOR COOLING MANAGEMENT

BACKGROUND OF THE INVENTION

1. Field of the Invention

The invention relates to and automation device and method for operating the automation device having a CPU module for processing a control program and a source module that is connected via a bus and is intended to supply sink modules of the automation device with electrical energy, where variables that are available to the automation device and influence the operation of the automation device are recorded.

2. Description of the Related Art

An automation device and method for operating the automation device are known, for example, from the Siemens catalog "ST PCS 7—June 2012", SIMATIC PCS 7 process control system. The variables influencing the operation or behavior of the automation device or the automation system are recorded, preprocessed and stored in the CPU module and are made available to a superordinate station for evaluation. Such influencing variables to be recorded cyclically, at predefined times or when particular events occur are understood as meaning, for example, the ambient temperature, the temperature of the printed circuit board of the source module, the supply air temperature, the humidity, the installation position of the modules or subassemblies in the switchgear cabinet (horizontal or vertical installation), the electromagnetic radiation, the dips in the supply voltage or the degree of utilization of the source module(s). Depending on the result of this evaluation, suitable measures are possibly initiated to reduce disruptive effects of the influencing variables. The disadvantage here is that the CPU module must retrieve the recorded influencing variables or "environmental data" cyclically or at predefined times and must preprocess the variables or data in a suitable manner with respect to storage, which signifies an additional load on the CPU module beyond the processing of its control program for controlling a technical process.

SUMMARY OF THE INVENTION

It is therefore an object of the invention to provide an automation device and method that make it possible to relieve the load on a CPU module when preprocessing influencing variables.

This and other objects and advantages are achieved in accordance with the invention by a method and automation device in which the influencing variables are stored in a source module (power supply) of the automation device, which source module is always present anyway, with the variables being stored such that the CPU module can easily access the influencing variables or environmental data. For this purpose, provision is made for consistent blocks each containing n environmental data items to be stored in the source module and to be kept available for a CPU access operation at any time, where a data record to be read at the reading time comprising the most up-to-date environmental data blocks and the storage of the environmental data is also not influenced by a CPU read access operation. The number of environmental data blocks provided in the read data record depends on the data record length specified within the scope of a read access operation by the CPU module. On account of the fact that the CPU module is always provided with all environmental data blocks stored in the source module in a readable manner, comprehensive error diagnosis is enabled if required. Following a read access operation, the environmental data can be evaluated and possible causes of failures may be inferred. An excessively high temperature in a switchgear cabinet may indicate, for example, failure of a fan or another cooling system, in which case relatively great consequential damage may occur if countermeasures are not initiated.

In an embodiment of the invention, an interface to an operating and monitoring device is provided via a software module of the CPU module, thus implementing a user-oriented interface to the environmental data.]

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below using an exemplary embodiment with reference to the figures, in which.

DETAILED DESCRIPTION OF THE PREFERRED EMBODIMENTS

Figure 1:
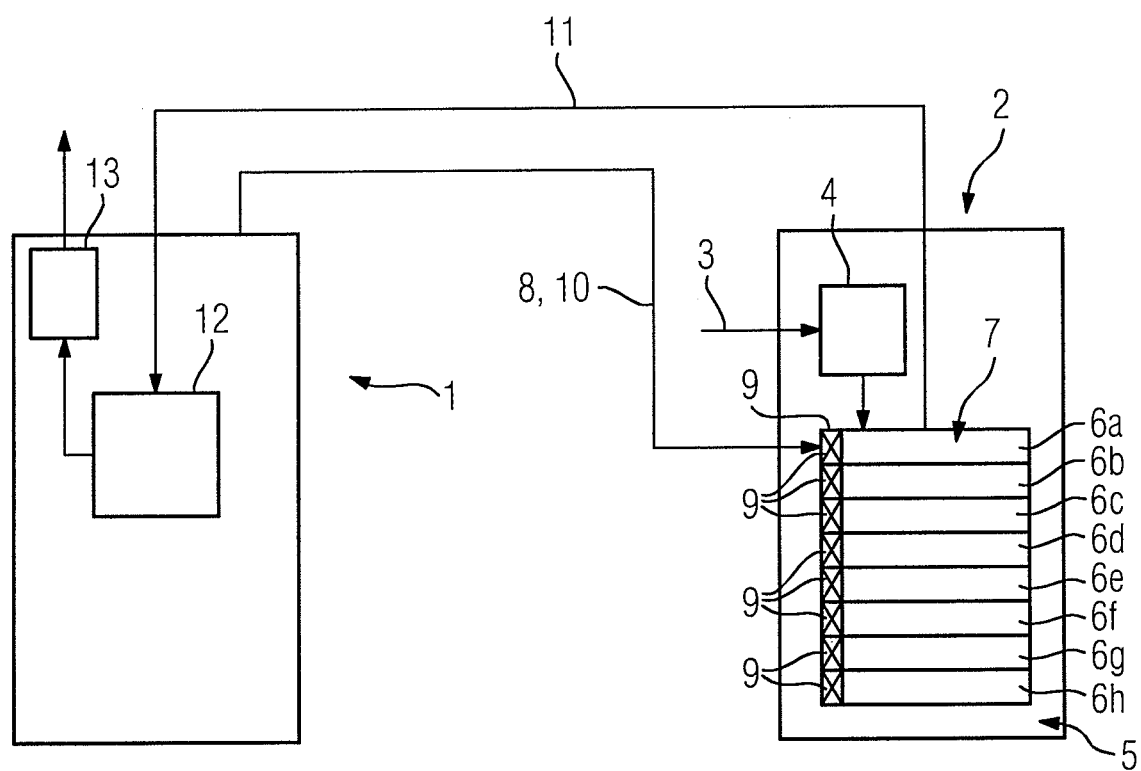
FIG. 1 shows a highly simplified illustration of parts of an automation device.

With respect to FIG. 1, the automation device includes a CPU module 1, a source module 2 and a multiplicity of sink modules (not shown). The modules 1, 2 (or the subassemblies) interchange information via a suitable bus connection and are connected to supply lines, where the source module 2 supplies the sink modules with electrical energy via these supply lines. The sink modules are, for example, in the form of controller modules or input/output modules, further automation components for controlling a technical installation also being provided, such as automation components comprising sensors, actuators and/or software components.

Variables that influence the operation of the automation device are recorded using suitable recording units and/or sensors and are transmitted to the source module 2 via connections 3, memory management software 4 storing these influencing variables in preprocessed form in a memory 5 of the source module 2. Here, provision is made for the influencing variables to be stored in a data record 7 having a plurality of data blocks 6a to 6h, where the software 4 assigns a predefined data record number 8 to this data record 7, which number can be used by the CPU module 1 to have read access to the data record 7. The data blocks 6a to 6h, in which influencing variables that belong together with respect to the temporal recording are stored (consistent data blocks), are provided with corresponding time stamps 9, where the current or most recent influencing variables is always stored in the data block 6a and the older data and is then able to be read via the data blocks 6b to 6h, irrespective of these time stamps 9. If the time stamp 9 is not informative, for example, because the time in the source module 2 differs from that in the CPU module 1 or the time in the source module is reset between two storage operations, the evaluation of the storage sequence alone suffices in the CPU module 1 to discern which influencing variables are the most up-to-date at the reading time. If the capacity of the memory 5 has been exhausted, the oldest influencing variables in a data block, such as a 64-byte data block, are overwritten with influencing variables to be newly stored.

Read access to the influencing variables is effected by virtue of the CPU module 1 accessing the data record 7 as part of a read request "read influencing variables" using the data record number 8 and a data record length 10 that represents the number of data blocks 6a to 6h to be read, where the data blocks 6a to 6h are always read starting with the data block 6a or always from the data block 6a onward. For example, with the data record number 8 and a value of "four" of the data record length 10, the first four data blocks 6a to 6d are read out and transmitted to the CPU module 1 via a data line 11 and, with the data record number 8 and a value of "six" of the data record length 10, the first six data blocks 6a to 6f are read out and transmitted to the CPU module 1 via a data line 11.

The situation may now occur in which the CPU module 1 has read access only to the data blocks 6a, 6b and 6c, but the source module 2 has newly written the data blocks 6a to 6g in the memory 5 since the last reading operation. This means that the influencing variables stored in the data blocks 6d and 6g are not available to the CPU module 1 for further processing. Therefore, it must be ensured that at least the number of data blocks written between two reading operations is always read. For the sake of security, some more blocks are read so that no data or influencing variables are lost. A continuous counter that is concomitantly stored in the individual data blocks 6a to 6f by the memory management software 4 can be used in a software module 13 of the CPU module 1 to detect, after reading, whether or not data blocks of the current reading operation have already been read in the previous reading operation. This continuous counter can also be used to determine whether too few data blocks have been read, i.e., data blocks have been lost.

In order to reduce the management effort, it should be understood that it is always possible to access the contents of all data blocks 6a to 6g as part of a CPU read access operation. The read access operation is limited solely by the communication connection 8, 10.

The influencing variables that have been read out are stored by the CPU module 1 in a memory 12 of the CPU module 1. The influencing variables stored in the memory 12 are available to a superordinate unit for evaluation, where a user-oriented interface to an operating and monitoring device for accessing the influencing variables is implemented via the software module 13 of the CPU module 1.

The invention thus comprises a method for operating an automation device having a CPU module 1 for processing a control program and a source module 2 that is connected via a bus and is intended to supply sink modules of the automation device with electrical energy, where variables that are available to the automation device and that influence the operation of the automation device are recorded, where the influencing variables are stored in a memory 5 of the source module 2 as a data record 7 having a plurality of data blocks 6a to 6h, and where a time stamp 9 is allocated to each data block 6a to 6h using the source module 2, and the CPU module 1 is used so as to have read access to the data record 7 having a predefined data record number 8 and a data record length 10 that represents the number of data blocks 6a to 6h to be read.

Figure 2:
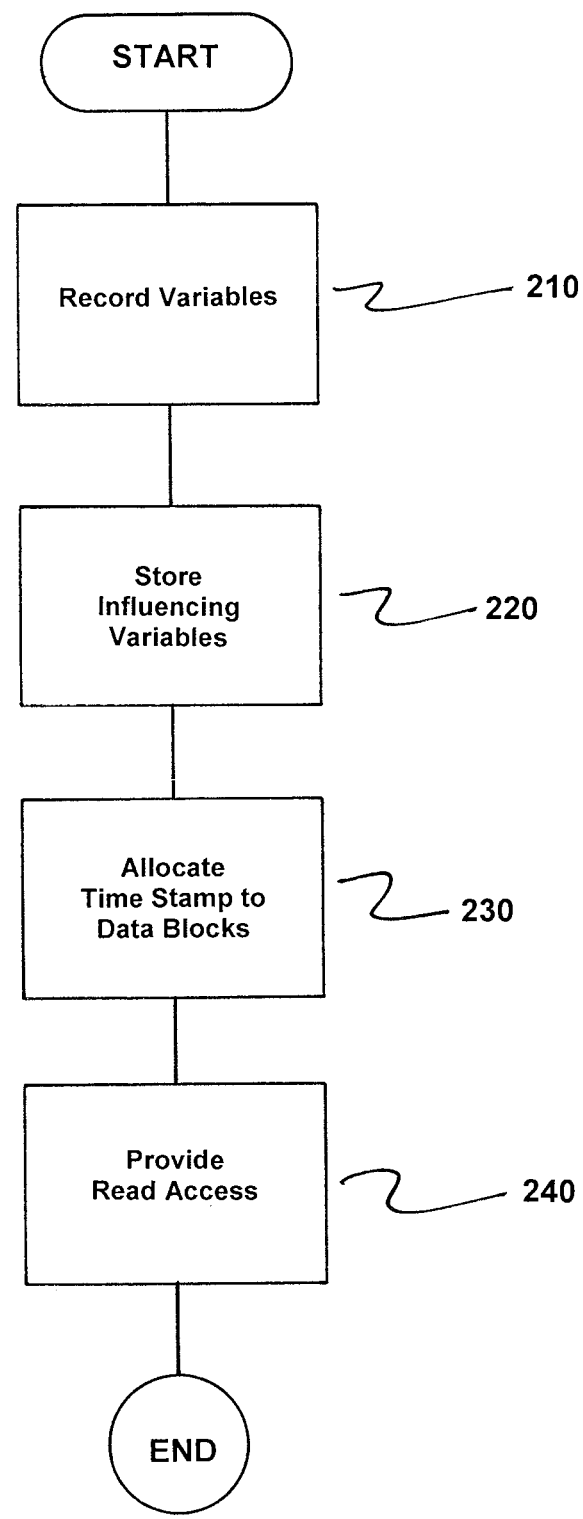
FIG. 2 is a flowchart of the method in accordance with the invention.

FIG. 2 is a flowchart of a method for operating an automation device having a CPU module for processing a control program and a source module connected via a bus and supplying sink modules of the automation device with electrical energy. The method comprises recording variables available to the automation device and influencing an operation of the automation device, as indicated in step 210.

Next, the influencing variables are stored in a memory of the source module as a data record having a plurality of data blocks, as indicated in step 220.

A time stamp is allocated to each data block of the plurality of data blocks using the source module, as indicated in step 230.

Read access is provided via the CPU module to the data record having a predefined data record number and a data record length representing a number of data blocks to be read, as indicated in step 240.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an automation device having a CPU module for processing a control program and a source module connected via a bus and supplying sink modules of the automation device with electrical energy, the method comprising:
   recording variables available to the automation device and influencing an operation of the automation device;
   storing influencing variables in a memory of the source module as a data record having a plurality of data blocks, a current or most recent influencing variable always being stored in a first data block of the plurality of data blocks, oldest influencing variables in the plurality of data blocks being overwritten with influencing variables to be newly stored when a capacity of the memory of the source module is exhausted;
   allocating a time stamp to each data block of the plurality of data blocks using the source module; and
   providing read access via the CPU module to a data record having a predefined data record number and a data record length representing a number of data blocks to be read.

2. The method as claimed in claim 1, wherein an interface to an operating and monitoring device is provided via a software module of the CPU module.

3. An automation device comprising:
   a CPU module for processing a control program;
   a source module connected via a bus for supplying sink modules of the automation device with electrical energy; and a recorder for storing for recording variables which influence operation of the automation device;

wherein the source module is configured to store influencing variables in memory of the source module as a data record having a plurality of data blocks and to allocate a time stamp to each data block of the plurality of data blocks, a current or most recent influencing variable always being stored in a first data block of the plurality of data blocks, oldest influencing variables in the plurality of data blocks being overwritten with influencing variables to be newly stored when a capacity of the memory of the source module is exhausted; and wherein the CPU module is configured to have read access to the data record having a predefined data record number and the data record length which represents a number of data blocks to be read.

4. The automation device as claimed in claim 3, wherein the CPU module includes a software module for providing an interface to an operating and monitoring device.

* * * * *